April 13, 1943.　　　　A. MAREIS　　　　2,316,268
PHOTOGRAPHIC EMULSION
Filed Nov. 14, 1939
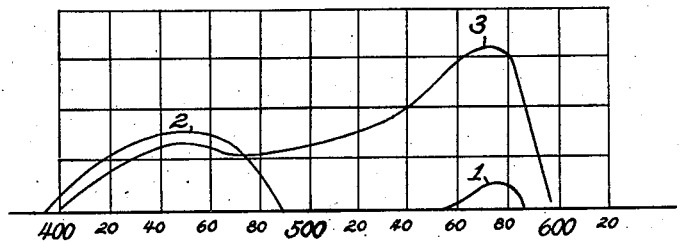
1 - emulsion with sensitizing dye
2 - emulsion with supersensitizer
3 - emulsion with mixture of
    sensitizing dye and super-
    sensitizer
Alfons Mareis
INVENTOR
BY
HIS ATTORNEYS Patented Apr. 13, 1943

2,316,268

UNITED STATES PATENT OFFICE 2,316,268

PHOTOGRAPHIC EMULSION

Alfons Mareis, Dessau, Germany, assignor, by mesne assignments, to General Aniline & Film Corporation, New York, N. Y., a corporation of Delaware Application November 14, 1939, Serial No. 304,300
In Germany November 24, 1938

3 Claims. (Cl. 95—7)

This invention relates to photographic emulsions and more particularly to supersensitized photographic silver halide gelatin emulsions.

It has previously been proposed to increase the intensity of optical sensitization of certain cyanine dyes in the production of sensitized photographic emulsions by adding a second sensitizing dye which acts on the optical sensitizer as a so-called supersensitizer. The dye Pinaflavol from α-methyl-pyridine-alkyl-iodide and p-dimethylamino-benzaldehyde was named as a supersensitizer.

It is an object of the invention to provide a novel supersensitized silver halide emulsion.

A further object is a novel process of sensitizing.

Still further objects of the invention will appear from the detailed specification following hereinafter.

I have found that the optical sensitization with 2.2'-monomethinecyanine dyes of the following general formula:

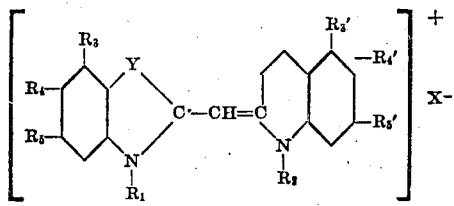

wherein $Y = -CH=CH-$, S, Se or O,
$R_1$ = alkyl,
$R_2$ = alkyl,
$R_3$, $R_4$, $R_5$, $R_{3'}$, $R_{4'}$, $R_{5'}$ = H, alkyl, alkoxy, aryl, phenylene
$X$ = an anion, is materially increased by employing as so-called supersensitizers the non-quaternary styryl compounds of nitrogen-containing heterocyclic bases with p-dialkylaminobenzaldehydes of the following formula:

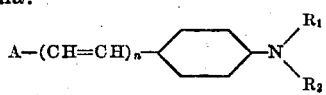

In this formula

A stands for any suitable nitrogen-containing heterocyclic ring system,
$n$ is 1 or 2,
$R_1$ and $R_2$ are identical or different alkyls.

These supersensitizers are not in themselves dyestuffs and do not resemble dyestuffs. They are added to the sensitizing dye or they may be added to the emulsion separately. Their concentration is in most cases materially lower than that of the sensitizing dye. In the amount in which they are employed they have no sensitizing action per se.

The single figure shows the action of the supersensitizer. The diagram 1 shows the sensitization of the quinopseudocyanine dye according to Example 1 for itself. The diagram 2 shows the spectral sensitivity of the emulsion with the added supersensitizer according to Example 1. This diagram corresponds exactly with the spectral sensitivity of the silver halide emulsion without any addition. Diagram 3 shows the spectral sensitivity of the emulsion containing the sensitizer and the supersensitizer.

The advantage of the supersensitizer according to this invention which is a non-quaternary feebly dyed compound in contrast to the quaternary styryl dyestuff resides in the fact, that smaller quantities may be employed which makes for a better fastness of the sensitization with an at least equal intensity of the sensitization compared with that obtained by employing a quaternary styryl dye. Furthermore, it is advantageous that the new supersensitizers in themselves do not sensitize a silver bromide or silver chloride emulsion to any practical extent or only in the region of the very short wave lengths. In contrast thereto the quaternary dyes, for instance Pinaflavol are well known to be good sensitizers for green and yellow. The supersensitizers of this invention therefore offer the advantage of a steep incline in sensitization. This allows the films prepared from the emulsions to be treated in bright darkroom light even if the emulsions are the modern emulsions of high sensitivity (for instance 21/10° din). A special third advantage of the new method of sensitization is their high stability against stabilizers of all kinds especially against the organic stabilizers for instance those of U. S. Patent No. 1,758,577 which are now usually employed.

The production of the non-quaternary styryl compounds is described in "Berichte" 39, (1906), page 27 to page 49, and "Berichte" 27, (1894), page 1969.

The following examples illustrate the invention:

Example 1

To 1 kilo of a medium sensitive silver halide gelatin emulsion produced according to the ammonia process with about 2 per cent of silver iodide of fine grain and steep gradation, there are added in the form of a methanol solution (1 in 10,000) 20 mg. of the sensitizers of the formula

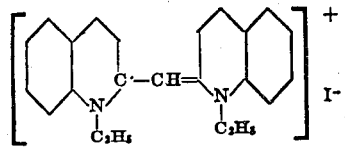

and 2 mg. of the weakly-yellow sensitizer of the following composition:

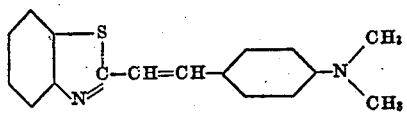

either singly or advantageously in mixture. The styryl compound in the amount stated does not sensitize per se. Clearness and gradation are not altered. The sensitized emulsion of this kind is highly useful as a highly ortho-chromatic miniature picture emulsion. The treatment of a material of this kind is possible in light-red light (for instance Agfa filter No. 107).

*Example 2*

To 1 kilo of the emulsion described in Example 1 there are added for the purpose of sensitization firstly 2 mg. of the supersensitizer described in Example 1 and then 30 mg. of the pseudocyanine of the following formula:

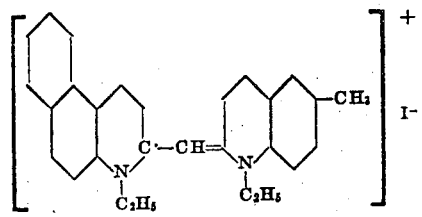

*Example 3*

To 1 kilo of a supersensitive emulsion containing 3 per cent of AgI and produced according to the ammonia process there are added 3 mg. of the supersensitizer described in Example 1 and 30 mg. of the pseudocyanine of the following formula:

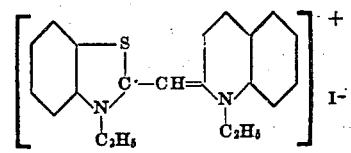

An emulsion of this kind is extremely well suited as a supersensitive ortho-chromatic motion picture film emulsion.

*Example 4*

To 1 kilo of a supersensitive emulsion containing 4 per cent of AgI there are added 3 mg. of a supersensitizer of the formula

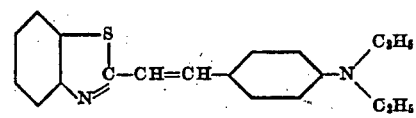

and 30 mg. of a dye of the formula

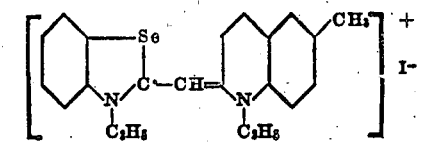

*Example 5*

To 1 kilo of the emulsion described in Example 3 there are added 2 mg. of a supersensitizer of the following formula

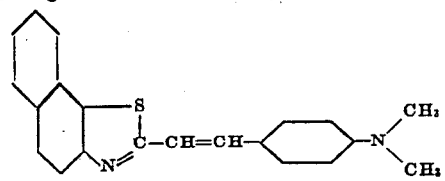

and 30 mg. of the dyestuff of the following formula

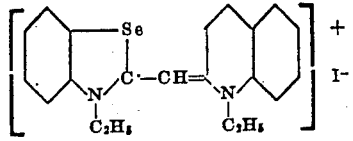

*Example 6*

To 1 kilo of the emulsion described in Example 1 there are added 2 mg. of a supersensitizer of the following formula

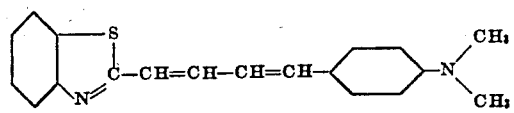

and 30 mg. of the pseudocyanine described in Example 1.

*Example 7*

To 1 kilo of a medium sensitive emulsion of steep gradation containing 3 per cent of AgI there are added 2 mg. of the supersensitizer according to Example 1, 10 mg. of N.N'-diethyl-pseudocyanine iodide plug 20 mg. of N.N'-diethyl-6'-methyl-selenopseudocyanine iodide (formula see Example 4).

I claim:
1. Photographic silver halide gelatin emulsion containing a 2.2'-monomethine cyanine and a non-quaternary styryl compound of the following general formula

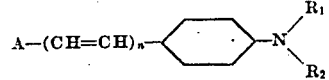

wherein A stands for a nitrogen-containing heterocyclic ring system; $n$ is 2; $R_1$, $R_2$ is alkyl.

2. A photographic silver halide emulsion as defined in claim 1 wherein the non-quaternary styryl compound has the following formula:

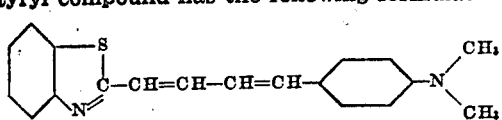

3. A photographic silver halide gelatin emulsion containing the following cyanine dye:

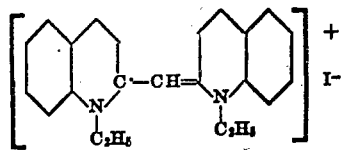

and a non-quaternary styryl compound of the following formula:

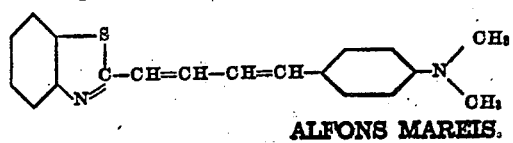

ALFONS MAREIS.